Sept. 26, 1939.  A. M. CLARK ET AL  2,173,877
RECOVERY OF SULPHUR DIOXIDE FROM GAS MIXTURES
Filed Oct. 10, 1935
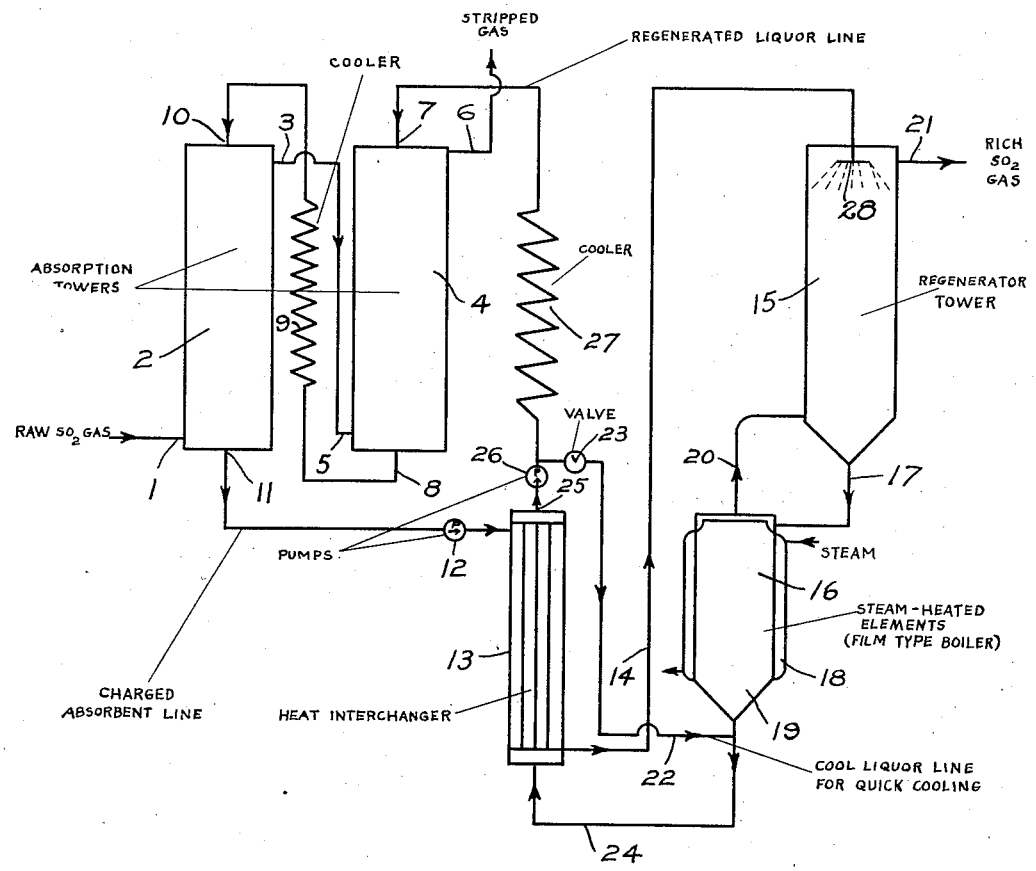
Arthur Maurice Clark
William Edward Ballen
Charles Frederick Reed Harrison
INVENTORS
BY George Lutz
ATTORNEY Patented Sept. 26, 1939

2,173,877

UNITED STATES PATENT OFFICE 2,173,877

RECOVERY OF SULPHUR DIOXIDE FROM GAS MIXTURES

Arthur Maurice Clark, William Edward Batten, and Charles Frederick Reed Harrison, Norton-on-Tees, England, assignors to Imperial Chemical Industries Limited, a corporation of Great Britain Application October 10, 1935, Serial No. 44,424
In Great Britain October 16, 1934

25 Claims. (Cl. 23—178)

This invention relates to processes of the kind in which gases containing sulphur dioxide in small concentration, e. g. gases derived from the roasting of sulphide ores, are treated with a suitable liquid absorbent from which the sulphur dioxide is subsequently expelled by heating and/or reduction of pressure, the regenerated absorbent being used again for absorbing further quantities of sulphur dioxide. Such processes are hereinafter referred to as regenerative absorption processes for sulphur dioxide.

We have now found that excellent absorbents for use in the said processes comprise solutions of basic aluminium sulphates. By basic aluminium sulphate solutions we mean solutions containing $Al_2O_3$ and $SO_3$, the $Al_2O_3$ being in excess of that required to form normal aluminium sulphate, $Al_2(SO_4)_3$. The excess of $Al_2O_3$, expressed as a percentage of the total $Al_2O_3$, is a measure of the basicity of the solution. Thus a solution containing $Al_2O_3$ and $SO_3$ in the molecular proportion of 2 to 3 will have 50% basicity. Preferred solutions for use according to the present invention are those having a basicity of 35-50%.

The lower the basicity the lower is the solubility of $SO_2$ for any given gas, and the minimum basicity may be regarded as determined by the minimum solubility of $SO_2$ which is regarded as satisfactory. The higher the basicity the lower is the stability of the solution, and although a basicity of say 66% can be approached in the preparation of the solutions such highly basic solutions are relatively unstable, and for this reason a maximum basicity of 50% is recommended for carrying out the process.

The solutions may be prepared in several ways, for example, by the addition of lime, chalk or calcium sulphite to a solution of aluminium sulphate $(Al_2(SO_4)_3)$ and removing the precipitated gypsum. Other compounds which form insoluble sulphates and do not leave non-volatile acid radicles in solution can be added for the same purpose. A further method of preparation consists in roasting aluminium sulphate so as to remove a part of the sulphur trioxide and dissolving the residue in water.

A preferred method of preparing the absorbent consists in dissolving the required excess of pure metallic aluminium in dilute sulphuric acid, e. g. of 15-20% strength. Small quantities of metallic mercury may be amalgamated with the aluminium to assist solution, the mercury being subsequently recovered unchanged. This method has the advantage over the previously mentioned methods employing aluminium sulphate, that the introduction of alkali metal salts which are frequently present in commercial aluminium sulphate is avoided. The presence of alkali metal salts tends to cause undesirable precipitation of insoluble basic aluminium sulphates when the absorbent has been in use for some time.

As an example of the process of the present invention, a gas containing 8% by volume of sulphur dioxide was washed at 20° C. with an aqueous absorbent containing 90 grams per litre of alumina and 105 grams per litre of sulphur trioxide. The resulting solution contained 100 grams per litre of sulphur dioxide, which on boiling was substantially completely evolved, leaving the liquor ready for the absorption of further sulphur dioxide.

When the initial gases contain oxygen, or sulphur trioxide, the sulphate content of the liquor gradually increases and the basicity diminishes owing to oxidation of dissolved sulphur dioxide or to solution of sulphur trioxide present in the gaseous phase. In such cases the liquor may be maintained at substantially the same basicity by adding suitable amounts of compounds such as lime, chalk or calcium sulphite, and separating the gypsum thereby precipitated. It is also possible to use barium compounds, e. g. barium carbonate, to remove sulphate ions, although the precipitate of barium sulphate is not so easy to remove as gypsum.

A convenient method of maintaining the correct basicity by preventing the accumulation of sulphate in the liquor consists in treating a suitable proportion of the liquor with an amount of calcium carbonate or other suitable compound which is sufficient to precipitate from the liquor that amount of sulphate which it is desired to remove from the whole of the liquor, and returning the treated proportion, after separation from the precipitated sulphate, to the general bulk of the liquor. The calcium carbonate or other compound may be added to the liquor as such or in the form of a suspension in water, or in some cases a solution. The proportion of the solution to be treated must be chosen so that when the desired quantity of sulphate is precipitated therefrom, its basicity does not rise above about 55%, otherwise precipitation of an insoluble basic sulphate is liable to take place.

The basicity of the solution may also be maintained substantially constant by adding the required amount of metallic aluminium (with which a small amount of mercury may be associated) to the liquor in which sulphate has accumulated. This method is particularly advantageous in cases in which some basic aluminium sulphate has been lost in the process, for instance by loss of liquor through spillage, etc. or by precipitation of insoluble material containing aluminium. A combination of this method and that described in the preceding paragraph may be employed to maintain the required composition and total amount of the liquor in circulation.

Although it is preferred to employ solutions which contain only basic aluminium sulphate, neutral salts such as $MgSO_4$, or small amounts of iron salts or salts of heavy metals, may be present without substantially affecting the absorptive and regenerative properties of the solution.

When the solution of basic aluminium sulphate has been in use for some time difficulties may arise owing to the precipitation of insoluble basic aluminium sulphates, the separation of which is attended by loss of absorbent and danger of choking the plane. The formation of this precipitate occurs when the solution is maintained for an appreciable time at a raised temperature, e. g. above 70° C., especially when the solution has been freed from $SO_2$. The rate of formation of the precipitate is greatly increased by the presence of traces of the precipitated material, small particles of which may remain suspended in the circulating liquor or may settle in parts of the apparatus and act as nuclei on which further quantities of the insoluble basic sulphate are rapidly deposited. The formation of a precipitate may also be brought about by the presence of small amounts of alkali metal salts in the solution, and for this reason such salts should be avoided in preparing the solution, as previously mentioned.

The precipitation of insoluble basic sulphates under the working conditions may however be hindered by adding certain substances such as phosphoric acid, or compounds of phosphoric acid and glycerol such as glyceryl phosphate. The quantity of added substance required varies according to the nature of the substance used. Thus, we have found that solutions of basic aluminium sulphate containing about 1-2% by volume of glyceryl phosphate are satisfactory. The addition of phosphoric acid and glycerol separately in equal proportions of about 0.5% by volume each also gives satisfactory results.

A further precaution that may be taken with a view to avoiding injurious precipitation consists in removing the small particles of precipitate before they have developed sufficiently to give rise to active precipitation. This may be carried out by periodically or continuously removing solid material at a suitable rate from the liquor by filtering, settling or centrifuging. Thus a filter may be installed in the circulatory system for treating part, or preferably all, of the circulating liquor. Alternatively, part of the liquor may be removed from the plant at intervals for treatment, or a number of separate liquor charges may be used with alternate periods of use and treatment.

In view of the fact that the rate of precipitation of insoluble basic aluminium sulphate is increased at raised temperatures, and especially in the absence of $SO_2$, it is desirable to take special precautions during operations in which these conditions prevail. It is, therefore, advantageous to carry out the regeneration of the absorbent by subjecting the liquor to reduced pressure in such a manner that the $SO_2$ is removed therefrom at temperatures not exceeding about 70-80° C. Instead of applying reduced pressure, regeneration by means of a stream of air or inert gas at a temperature below 80° C. may be adopted. Under these circumstances even should there be small particles of precipitated material in the liquor, their presence is not serious.

At higher temperatures, however, it is necessary to prevent solid particles remaining for any appreciable length of time in the hot liquor. If solid particles are allowed to remain suspended in hot stagnant liquor or to remain stationary and in continuous contact with hot circulating liquor, they are liable to give rise to rapid precipitation, and these conditions must consequently be avoided. Rapid heating of the liquor followed by rapid cooling may be a sufficient precaution, provided the apparatus is frequently washed out to remove any particles which may have lodged therein, but we prefer to carry out the regeneration of the absorbent liquor by heating it whilst in a non-stagnant state, for example, in a film type or other boiler, in which it is not possible for any of the liquor to become stagnant and in which the lodgement of solid particles is prevented by the continuous flow of the liquor. The construction of the boiler is such that the hot liquor does not come into contact with obstructions to the flow of the liquor, such as sharp corners, rough surfaces or projecting or re-entrant parts where solid particles may lodge or pockets of stagnant liquor be formed, in which solid particles may settle. A satisfactory apparatus consists of a boiler of the film type having a conical base, in which the liquor flows down in the form of a film under the action of gravity over smooth heating surfaces and passes immediately into a heat exchanger through the conical base of the boiler. Preferably the liquor is rapidly cooled, say to 85° C. or lower, for instance by admixture with a suitable quantity of cold liquor, before passing into the heat exchanger.

Another possible method of regeneration consists in causing the liquor to flow in countercurrent with steam or other gaseous heating agent, for instance, in a tower.

It is to be understood that the various means above described of preventing the precipitation of insoluble material in the absorbent liquor may be used severally or in combination one with another.

A suitable plant for carrying out the process of the invention is shown, by way of example, in the accompanying drawing, which is a diagrammatic flow sheet. In this drawing the raw $SO_2$ gas is introduced at 1 into the base of a scrubbing tower 2. The gas leaves the top of the tower at 3 and enters a further scrubbing tower 4 at the point 5. The gas leaving the top of the tower 4 at 6 is substantially completely stripped of its $SO_2$ content and is discharged to atmosphere.

The fresh absorbent liquor is fed to the top of the tower 4 at 7, is withdrawn at the bottom at 8 and passes through a cooler 9 prior to introduction into the tower 2 at 10. The absorbent liquor is withdrawn from the tower 2 at 11 by means of a pump 12 and passes through a heat exchanger 13, from which by pipe 14 it flows to a regeneration tower 15. The liquor is sprayed through a nozzle 28 and meets a mixture of steam and $SO_2$ rising through the tower which is supplied by the boiler 16. The liquor leaves the regeneration tower at 17 and flows to the boiler 16, which is heated by a steam jacket 18. The boiler is of the film type, the liquor flowing down steam heated elements to the conical sump 19. Vapours from the boiler pass via pipe 20 to the regeneration tower 15, the steam being partially condensed therein while concentrated $SO_2$ gas mixed with some steam passes off at 21.

Immediately on leaving the conical sump 19 the liquor is cooled by mixing it with cool liquor flowing through the pipe 22 which contains a control valve 23. The cooled mixed liquor then flows via pipe 24 to heat exchanger 13, from which it emerges at 25 to be pumped by pump 26 through a cooler 27 prior to introduction into the tower 4 at 7.

One method of operation of the process according to the invention is shown in the following example, to which, however, the invention is not limited:

Example

A gas containing 7.0% by volume of $SO_2$ and 2.0% by volume of oxygen was passed through two scrubbing towers in series at the rate of 5000 cubic metres per hour.

A solution of basic aluminium sulphate containing 100 kg. of $Al_2O_3$ and 118 kg. $SO_3$ per cubic metre (i. e. a solution of 50% basicity) to which had been added 0.5% by volume of glycerol and 0.5% by volume of phosphoric acid, was fed through the towers, at the rate of 9.5 cubic metres per hour, countercurrent to the gas stream. The liquor was cooled after passing through the first tower and before entering the second tower, in order to remove the heat generated in dissolving the $SO_2$.

The liquor leaving the second tower contained 94.5 kg. $SO_2$ per cubic metre of liquor. The exit gas from the top of the first tower contained 0.2% by volume of $SO_2$ and was discharged to atmosphere.

The liquor containing $SO_2$ was then pumped through a heat exchanger, in which its temperature was raised to 75° C., to the top of a regeneration tower, down which it was sprayed, being withdrawn through a pipe in the conical bottom of the tower and directed to a boiler containing smooth steam heated elements. After flowing over these elements the liquor was immediately withdrawn through a pipe in the conical bottom of the boiler. In passing over the heated elements the liquor was boiled, and the steam thus liberated passed up the tower, assisting in the stripping of the $SO_2$ from the liquor. The gas leaving the tower at a temperature of 80° C. consisted of a mixture of 45 parts by volume of steam with 55 parts of $SO_2$, together with a negligible quantity of inert gases which had been dissolved in the liquor. The major part of the steam was condensed by cooling the gas to 30° C., the condensed steam being returned to the main bulk of liquor in order to maintain its concentration at the required value. The residual gas consisted of almost pure $SO_2$ saturated with water vapour at 30° C.

The liquor leaving the boiler at 100° C. was immediately cooled to a temperature of 85° C. by mixing with it a portion of already cooled liquor. It was then led through the heat exchanger in countercurrent to the flow of $SO_2$-containing liquor passing to the regeneration tower. The liquor leaving the heat exchanger was finally cooled in a film cooler and returned to the stock tanks.

It was found that under these conditions of operation approximately 1% of the absorbed $SO_2$ was oxidised to $SO_3$ during the process of absorption, the $SO_3$ thus formed remaining in the absorption liquor.

After the process had been in continuous operation for 24 hours, therefore, it was found that with 30 cubic metres of liquor in stock, the liquor then contained 100 kg. of $Al_2O_3$ and 127 kg. of $SO_3$ per cubic metre, its basicity being thus reduced to approximately 47%. In order to restore the liquor to its original condition, therefore, 15 cubic metres of the liquor were transferred to a separate vessel and treated by stirring with a quantity of milk of lime containing 211 kg. of $CA(OH)_2$. After a period of three hours the liquor was filtered to remove the gypsum formed by reaction with the milk of lime. The filtered liquor contained $Al_2O_3$ and $SO_3$ in the ratio of 100 kg. $Al_2O_3$ to 110.4 kg. of $SO_3$, corresponding to a basicity of 53%. This liquor was then returned to the stock tanks, where it was mixed with the remainder of the liquor, thus restoring the basicity of the whole bulk to a value of 50%.

Under these conditions of operation no precipitate of insoluble basic aluminium sulphate accumulated in any of the vessels, but after some time the liquor became somewhat turbid. The whole of the liquor was therefore filtered to remove suspended matter and returned to the system.

The concentration of $Al_2O_3$ in the liquor was maintained at an average value of 100 kg. per cubic metre by discarding water when necessary from the condensate obtained by cooling the gas leaving the regenerator, or by the addition of fresh water to the system when the concentration tended to rise. When the amount of liquor in stock had been reduced by spillage and by slight unavoidable losses in filtration of the gypsum during sulphate removal, the amount of the loss was made good by suspending the process of removing sulphate by the addition of milk of lime, and instead a portion of the liquor of low basicity was circulated through a tower packed with scrap aluminium turnings. By this means, aluminium was dissolved in the solution. Water was added to maintain the concentration at 100 kg. per cubic metre of $Al_2O_3$, and when the basicity of the circulated liquor had risen to 55%, circulation was stopped, and the liquor was returned to the main stock. The basicity of the whole of the liquor was thus restored to the required value of 50% and the liquor losses were made good. When the stock of liquor had been augmented by the required amount, this process was suspended, and the method of sulphate removal by treatment with milk of lime was resumed.

The apparatus and in particular any parts thereof which are subjected to hot liquor, should be constructed of suitable non-corroding material. We have found that steels of low carbon content containing chromium, nickel and molybdenum, are satisfactory. The addition of small quantities of titanium to the steel is sometimes an advantage. A very suitable material of construction consists of steel of the following composition:

| | Per cent |
|---|---|
| Carbon | Not more than 0.06 |
| Chromium | 17.5–19.5 |
| Nickel | 8.0–10.0 |
| Molybdenum | 4.0– 4.5 |
| Titanium | Not less than 0.25 |

We claim:
1. A regenerative absorption process for the recovery of $SO_2$ which comprises absorbing $SO_2$ in an aqueous solution of basic aluminum sulphate in which the $SO_3$ to $Al_2O_3$ ratio is such that the $SO_3$ is insufficient to form the normal sulphate but sufficient at least to keep substantially all the $Al_2O_3$ in solution whereby substantially all the absorbed $SO_2$ may be regenerated without substantial precipitation of basic aluminum sulphate, and regenerating $SO_2$ therefrom.

2. A regenerative absorption process for the recovery of $SO_2$ which comprises absorbing $SO_2$ in an aqueous solution of basic aluminum sulphate in which the $SO_3$ to $Al_2O_3$ ratio expressed in per cent basicity is about 35 to about 50 per cent, and regenerating $SO_2$ therefrom.

3. A regenerative absorption process comprising treating gases containing $SO_2$ with an absorbent liquor consisting essentially of an aqueous solution of basic aluminium sulphate containing a modicum of phosphoric acid.

4. A regenerative absorption process comprising treating gases containing $SO_2$ with an absorption liquor consisting essentially of an aqueous solution of basic aluminium sulphate containing a modicum of phosphoric acid and glycerol.

5. A regenerative absorption process comprising treating gases containing $SO_2$ with an absorbent liquor consisting essentially of an aqueous solution of basic aluminium sulphate containing a modicum of a compound of phosphoric acid and glycerol.

6. In a regenerative absorption process for the recovery of $SO_2$ employing as an absorbent liquor an aqueous solution of basic aluminum sulphate in which the $SO_3$ to $Al_2O_3$ ratio is such that the $SO_3$ is insufficient to form the normal sulphate but sufficient at least to keep substantially all the $Al_2O_3$ in solution and in which said ratio tends to increase due to the accumulation of sulphate, the method of reducing the $SO_3$ to $Al_2O_3$ ratio and thereby restoring the absorbent solution to the proper basicity which comprises adding to the absorbent solution a reactive substance which forms an insoluble sulphate and removing the insoluble sulphate thus formed, the amount of said substance added being insufficient to cause any substantial precipitation of basic aluminum sulphate.

7. A process as set forth in claim 6, in which the reactive substance is selected from the group consisting of lime, hydrated lime, calcium carbonate and calcium sulphite.

8. In a cyclic regenerative absorption process for the recovery of $SO_2$ employing as an absorbent liquor a circulating aqueous solution of basic aluminum sulphate in which the $SO_3$ to $Al_2O_3$ ratio is such that the $SO_3$ is insufficient to form the normal sulphate but sufficient at least to keep substantially all the $Al_2O_3$ in solution and in which said ratio tends to increase due to accumulation of sulphate, the method of adjusting the $SO_3$ to $Al_2O_3$ ratio to restore the absorbent solution to the proper basicity which comprises withdrawing a portion of the circulating solution from the circulating system, adding to said portion a reactive substance which forms an insoluble sulphate, removing the insoluble sulphate therefrom, and then returning said portion to the circulating system, the amount of said substance being insufficient to cause any substantial precipitation of basic aluminum sulphate.

9. A process as set forth in claim 8, in which the portion of liquor withdrawn from the circulating system for sulphate removal bears such a relation to the total bulk of liquor in the circulating system that the basicity of said total bulk can be restored to 35–50 per cent. by addition thereto of the treated portion without the basicity of the said treated portion rising above 55 per cent.

10. In a regenerative absorption process for the recovery of $SO_2$ employing a circulating absorbent liquor containing basic aluminum sulphate in which loss of absorbent results in operation of the process, the step of dissolving metallic aluminum in said absorbent liquor as required to make good loss of absorbent.

11. A process as set forth in claim 10, in which a small amount of mercury is associated with the aluminium to facilitate its solution.

12. In a regenerative absorption process for $SO_2$ employing a circulating absorbent liquor containing basic aluminum sulphate, the steps of withdrawing a portion of the circulating liquor from the circulating system, dissolving sufficient metallic aluminum in the said portion to make good any lost absorbent, and returning the aluminum-enriched liquor to the circulating system.

13. A process as set forth in claim 12, in which the portion of liquor withdrawn from the circulating system for enrichment in aluminium bears such a relation to the total bulk of liquor in the circulating system that the basicity of said total bulk can be restored to 35–50 per cent by addition thereto of the treated portion without the basicity of said treated portion rising above 55 per cent.

14. In a cyclic regenerative absorption process for the recovery of $SO_2$ employing as an absorbent liquor an aqueous solution of basic aluminum sulphate in which the $SO_3$ to $Al_2O_3$ ratio expressed in per cent basicity is maintained above about 35 per cent whereby the stability of the solution is such that the presence of undissolved basic aluminum sulphate tends to promote precipitation of basic aluminum sulphate, the method whereby the tendency of basic aluminum sulphate to precipitate is suppressed which comprises removing any precipitated basic aluminum sulphate before passing the absorbent liquor thru another cycle of operation.

15. A regenerative absorption process for the recovery of $SO_2$ which comprises absorbing $SO_2$ in an aqueous solution of basic aluminum sulphate in which the $SO_3$ to $Al_2O_3$ ratio expressed in per cent basicity maintained at about 35 to about 50 per cent whereby the stability of the solution is such that precipitation of basic aluminum sulphate is likely to occur at temperatures above about 80° C., and regenerating $SO_2$ from said solution by heating it under reduced pressure in a manner such that the $SO_2$ is removed at a temperature not exceeding about 80° C.

16. A regenerative absorption process for the recovery of $SO_2$ which comprises absorbing $SO_2$ in an aqueous solution of basic aluminum sulphate in which the $SO_3$ to $Al_2O_3$ ratio expressed in per cent basicity is maintained at about 35 to about 50 per cent whereby the stability of the solution is such that precipitation of basic aluminum sulphate is likely to occur at temperatures above 80° C., and regenerating $SO_2$ from said solution by bringing it into contact with a stripping gas at a temperature below about 80° C.

17. A regenerative absorption process for the recovery of $SO_2$ which comprises absorbing $SO_2$ in an aqueous solution of basic aluminum sulphate in which the $SO_3$ to $Al_2O_3$ ratio expressed in per cent basicity is maintained at about 35 to about 50 per cent whereby the stability of the solution is such that precipitation of basic aluminum sulphate is likely to occur at temperatures above about 80° C., and regenerating $SO_2$ from said solution by heating it in a manner such that the time during which said solution is above about 80° C. is substantially uniform for each and every increment thereof.

18. A regenerative absorption process for the recovery of $SO_2$ which comprises absorbing $SO_2$ in an aqueous solution of basic aluminum sulphate in which the $SO_3$ to $Al_2O_3$ ratio expressed in per cent basicity is maintained at about 35 to about 50 per cent whereby the stability of the solution is such that precipitation of basic aluminum sulphate is likely to occur at temperatures above about 80° C., and regenerating $SO_2$ from said solution by causing a continuous and uniform flow of said solution thru a heating means in a manner such that any solid particles in said solution are carried on thru the heating means by the continuous flow of said solution.

19. In a regenerative absorption process for $SO_2$, employing an absorbent liquor containing basic aluminium sulphate, the step of regenerating said liquor by heating it while flowing in film formation over smooth heating surfaces.

20. A process as set forth in claim 19 in which the liquor collected from the heating surfaces is immediately cooled.

21. A regenerative absorption process for the recovery of $SO_2$ which comprises absorbing $SO_2$ in an aqueous solution of basic aluminum sulphate in which the $SO_3$ to $Al_2O_3$ ratio expressed in per cent basicity is maintained at about 35 to about 50 per cent whereby the stability of the solution is such that precipitation of basic aluminum sulphate is likely to occur at temperatures above about 80° C., and regenerating $SO_2$ from said solution by rapid heating followed by rapid cooling, the rate of heating and cooling and the time intervening being such that the time during which any portion of the solution is at a temperature above about 80° C. is insufficient to cause appreciable precipitation of basic aluminum sulphate.

22. A process as set forth in claim 21, in which the liquor is heated by passing it in countercurrent with a gaseous heating agent.

23. A regenerative absorption process for the recovery of $SO_2$ which comprises scrubbing an $SO_2$-containing gas with an aqueous solution of basic aluminum sulphate in which the $SO_3$ to $Al_2O_3$ ratio expressed in per cent basicity is maintained at about 35 to about 50 per cent whereby the stability of the absorbent solution is such that precipitation of basic aluminum sulphate is likely to occur at temperatures above about 80° C., heating said solution to drive off its $SO_2$ content and then cooling the resulting regenerated solution, said heating and cooling being so correlated that the time during which the solution is at a temperature above about 80° C. is insufficient to cause appreciable precipitation of basic aluminum sulphate.

24. A regenerative absorption process for the recovery of $SO_2$ which comprises scrubbing an $SO_2$-containing gas with an aqueous solution of basic aluminum sulphate in which the $SO_3$ to $Al_2O_3$ ratio expressed in per cent basicity is maintained at about 35 to about 50 per cent whereby the stability of the solution is such that precipitation of basic aluminum sulphate is likely to occur at temperatures above about 80° C., passing the $SO_2$-charged solution thru a heat exchanger in indirect contact with hot regenerated solution, further heating said $SO_2$-charged solution to drive off its $SO_2$ content, rapidly cooling the resulting regenerated solution to a temperature in the neighborhood of about 80° C. but not above about 85° C., and returning the thus cooled regenerated solution thru said heat exchanger to heat further quantities of said $SO_2$-charged solution.

25. A regenerative absorption process for $SO_2$ which comprises scrubbing an $SO_2$ containing gas with an absorbent liquor containing dissolved basic aluminum sulphate, passing the used liquor charged with $SO_2$ through a heat exchanger in indirect contact with hot regenerated liquor which has been stripped of its $SO_2$ content, further heating said used liquor to drive off its $SO_2$ content, returning the resulting regenerated liquor through said heat exchanger to cool the regenerated liquor, and returning a portion of the cooled regenerated liquor to the hot regenerated liquor.

ARTHUR MAURICE CLARK.
WILLIAM EDWARD BATTEN.
CHARLES FREDERICK REED HARRISON.